March 22, 1966    D. H. BOTTRILL    3,241,594
METHOD AND APPARATUS FOR VAPORIZING AND BURNING FUEL OIL
Filed March 25, 1963    4 Sheets-Sheet 1
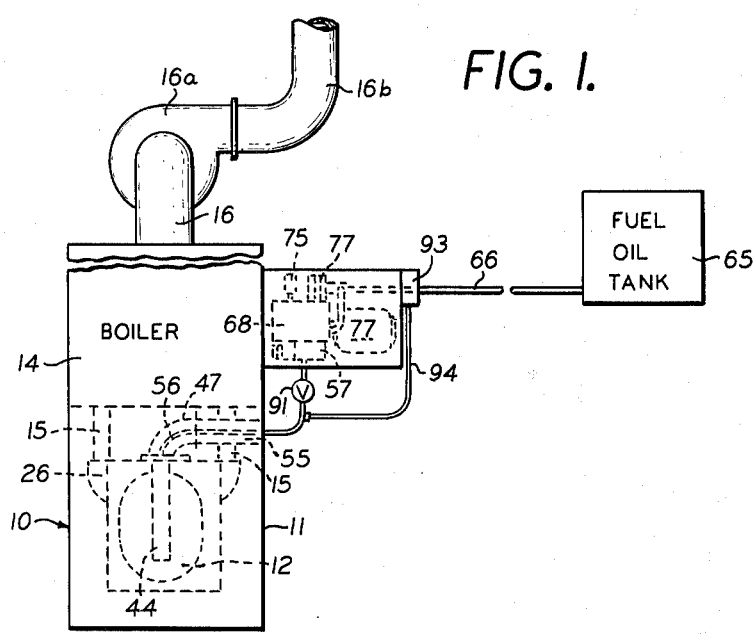
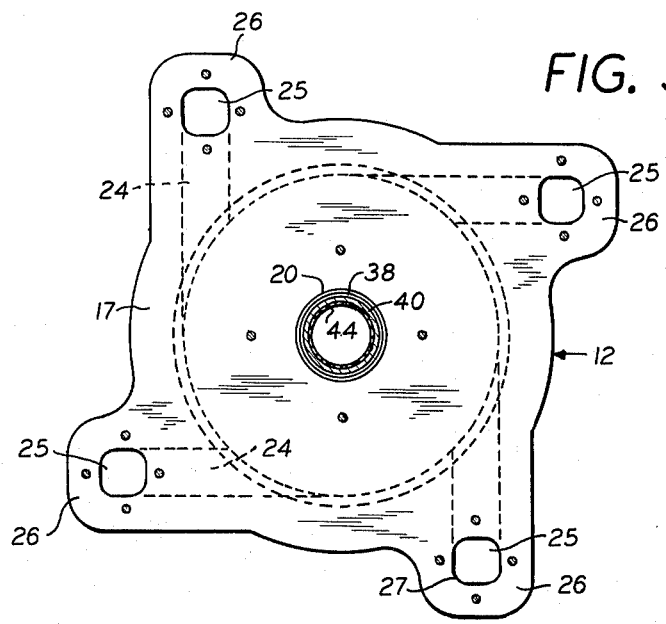
INVENTOR
DAVID H. BOTTRILL
BY
HIS ATTORNEYS.

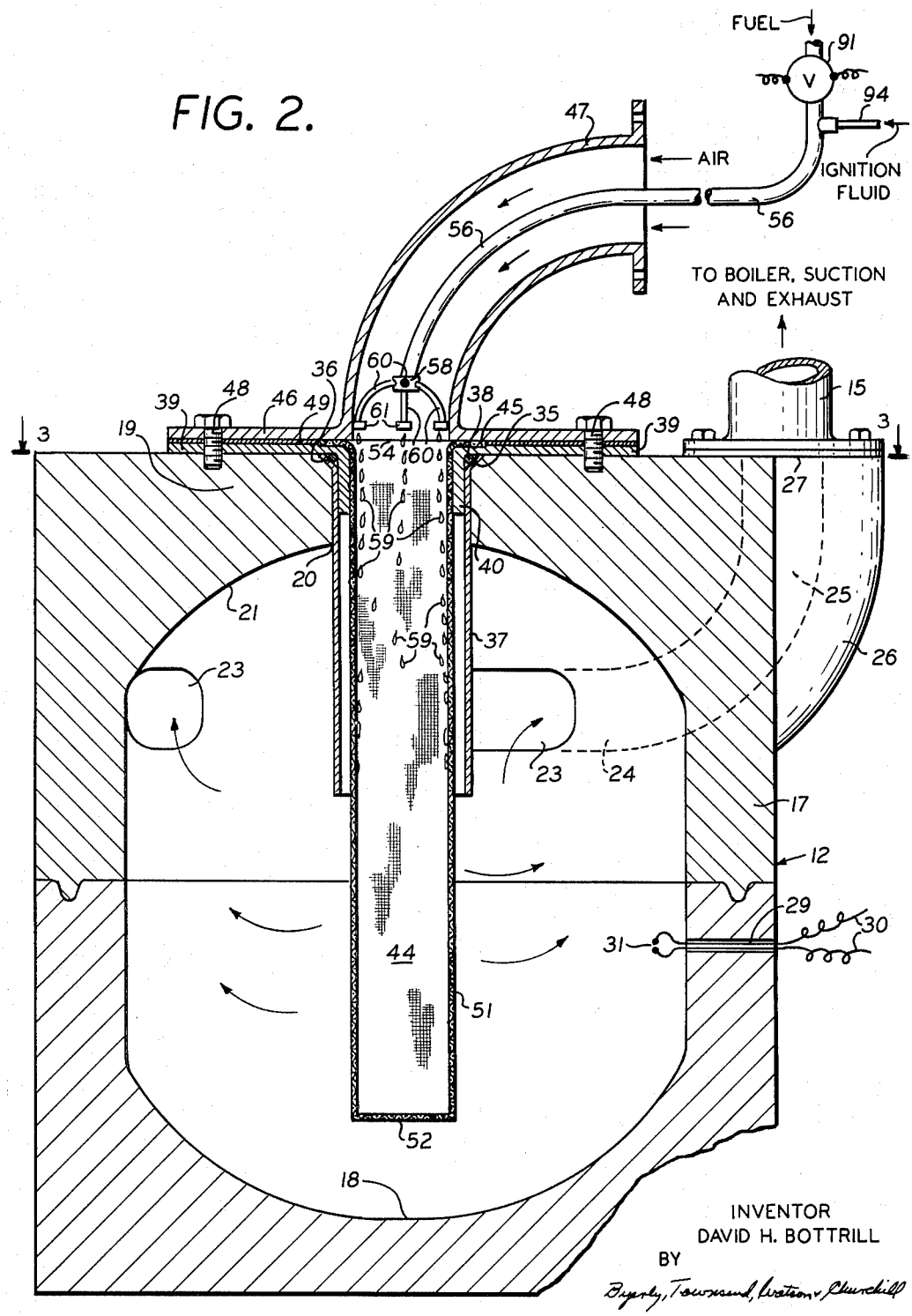

March 22, 1966     D. H. BOTTRILL     3,241,594
METHOD AND APPARATUS FOR VAPORIZING AND BURNING FUEL OIL
Filed March 25, 1963     4 Sheets-Sheet 3

INVENTOR
DAVID H. BOTTRILL
BY

HIS ATTORNEYS.

March 22, 1966  D. H. BOTTRILL  3,241,594
METHOD AND APPARATUS FOR VAPORIZING AND BURNING FUEL OIL
Filed March 25, 1963  4 Sheets-Sheet 4

INVENTOR
DAVID H. BOTTRILL
BY
HIS ATTORNEYS.

United States Patent Office 3,241,594
Patented Mar. 22, 1966

3,241,594
METHOD AND APPARATUS FOR VAPORIZING AND BURNING FUEL OIL
David H. Bottrill, White Plains, N.Y., assignor of one-fourth to Ralph M. Watson, Montclair, N.J.
Filed Mar. 25, 1963, Ser. No. 267,446
10 Claims. (Cl. 158—5)

This invention relates to heating and aims to provide a new method and apparatus for vaporizing and burning fuel oil. It is a particular object of my invention to increase the efficiency with which fuel oil can be utilized in domestic furnaces.

The furnaces that have been operated on fuel oil in the past have usually been equipped with burners of the "pressure" type. In such furnaces, oil is generally forced through nozzles which spray it into the combustion chamber of the furnace in the form of very fine droplets. Pressure type burners are expensive and they are costly to operate as considerable energy must be expended to atomize or subdivide the oil into small droplets; and the combustion that attends their use is, under favorable circumstances, so incomplete as to render them quite inefficient. The quantity of carbon dioxide contained in the flue gas discharged from a furnace equipped with a burner of this type, which is a measure of the efficiency of the furnace, is frequently found to be as low as 6% or 7%, which is less than half the amount theoretically obtainable. During operation there is a tendency for carbon deposits to form on the nozzles with a further loss of efficiency, and even complete nozzle failure may result therefrom. The furnaces that are equipped with pressure type burners are noisy and because of their inefficiency, they frequently emit an extremely objectionable quantity of dirty, offensive smoke.

Attempts have been made to use vaporizing burners in the past but they have been generally limited to the "pot" type which is also inefficient and smoky, and builds up a very objectionable carbon deposit in use. The limitations upon the ability of a pot type burner to vaporize fuel have been such that they have been generally limited to fuels of the kerosene type. The less expensive fuels, such as the No. 2 fuel oil or distillate that is used in the ordinary pressure type burner, cannot be used in those pot burners. Notwithstanding the disadvantages to which the pressure type burners are subject, they have largely displaced the vaporizing pot burners in the market.

I have discovered that it is possible to feed fuel oil such as No. 2 distillate to a furnace by gravity and to vaporize that fuel oil before it reaches the zone in the furnace where combustion occurs so that it can then be burned quietly and efficiently in a compact combustion chamber of inexpensive construction, and without smoking or creating an objectionable carbon deposit. In the practice of my invention, the oil is vaporized by feeding it continuously to the furnace in such manner that it is formed into a film that flows downwardly along a generally cylindrical path through a perpendicular vaporizing zone located along the axis of the furnace. Heat is supplied to that vaporizing zone so that there is maintained, along the path of the oil, a temperature gradient which rises from below the distillation temperature of the oil at its entry into the furnace to a temperature which, at a lower point in its path through the vaporizing zone, is substantially above the distillation temperature of the oil. Air for combustion is fed to the furnace so that it flows concurrently with the oil and issues from the vaporizing zone, in admixture with oil vapors, to a combustion zone which surrounds the vaporizing zone. The oil vapors are burned in that combustion zone so that heat, sufficient to maintain an appropriate vaporizing temperature gradient along the path of the oil in the vaporizing zone, is supplied to that vaporizing zone so long as oil is fed to the furnace. Thereafter, the products of combustion and hot gases are withdrawn from the furnace. I have found that the $CO_2$ content in the flue gas so produced is normally about 13.5%.

The furnace that I employ in the practice of my invention is provided with a heat-resistant combustion chamber having a generally cylindrical side wall, a floor and a roof provided with an axial inlet opening. A tangential passageway extends through the side wall of the combustion chamber adjacent its upper end and communicates with an exhaust port whence hot gases and products of combustion may be directed to a heat exchanger. A hollow porous cylinder of heat-resistant material is suspended from the roof of the combustion chamber so that it communicates with the inlet opening therein and extends downwardly along the axis of that chamber to a point near its floor. Means are provided for supplying oil to the interior of the hollow cylinder at its upper end so that the oil is fed to, and flows downwardly in a film over, the inner surface of that cylinder. Means are also provided for supplying air for combustion so that it is admitted to the combustion chamber through the inlet opening and flows through the pores in the hollow cylinder to a combustion zone contained within the combustion chamber; and for withdrawing hot gases and products of combustion from the combustion chamber through the tangential passageway.

The porous hollow cylinder that defines the vaporization zone in the furnace that I have invented is a most important feature of my invention. It is readily fabricated from a woven screen. The screen that I prefer to use in the practice of my invention, and with which I have secured best results when burning No. 2 fuel oil in my furnace, is about 60 mesh per inch, U.S. standard woven screen size. However, the mesh of the screen that I may use in the practice of my invention is not limited to 60 mesh. I have found that it may range from about 40 mesh to about 100 mesh. When such a screen is employed, combustion of oil vapor can be initiated in, and confined to, the space surrounding the exterior of the screen.

While the heat of combustion during the operation of my new furnace in accordance with my invention will maintain the lower portion of the cylindrical screen at a temperature which approaches, but does not substantially exceed, 1300° F., the flow of fresh air through the screen and the vaporization of the oil that is fed to the furnace exert a cooling effect which prevents the inlet through which the fuel oil is introduced into the combustion chamber of the furnace from reaching the vaporization temperature of that fuel oil. At the same time, the temperatures of the fuel oil and of the fresh air for combustion are gradually raised as they flow downwardly through the porous cylinder so that a regenerative type of operation is achieved. Materials that will withstand the temperatures to which the porous cylinder is subjected in the practice of my invention, and which may be woven into an appropriate screen, include stainless steel wire. A filament form of heat resistant glass, such as that marketed by Corning Glass Works of Corning, New York, under the trade name "Pyroceram," may also be used. It is a further important feature of my invention that oil vapor and air issuing through the pores of the cylinder into the combustion zone are caused to travel upwardly outside of that cylinder in a spiral path by virtue of the fact that hot gases and products of combustion are withdrawn from the generally cylindrical combustion chamber through a tangential passageway located at the upper end of that chamber. Combustion efficiency is greatly increased thereby, for the elongated spiral path of the flame in the combustion chamber not only promotes the mixing of oil vapor and air for combustion but also provides the type of recirculation of gases in the combustion chamber which assures combustion of unburned particles of fuel in stream on the way to the heat exchanger.

My invention is also characterized by the fact that it permits the continuous operation of a furnace throughout an entire heating season in an economical manner without any shutdown. This is made possible by virtue of the fact that the rate at which my furnace can be operated may be modulated. This is so because the furnace can be designed to burn oil efficiently at a rate which will supply sufficient heat to maintain the desired temperature within a house under the lowest temperature conditions that it will encounter, and the quantity of oil and air supplied to the furnace can be automatically reduced, pursuant to the action of a thermostatic control, to operate at a lower heat output rate without sacrificing the ability of the combustion zone in the furnace to supply sufficient heat to the vaporizing zone to maintain volatilization of the fuel oil so long as it is fed to the furnace. Thus, a furnace designed to heat an ordinary 8-room house throughout the winter in a climate such as that which obtains in the middle Atlantic States can be operated on about ¾ gallon of oil per hour to supply sufficient heat to meet the lowest temperature conditions encountered in such climate and, as heat requirements are reduced through a rise in the external temperature, the quantity of oil and air supplied to the furnace can be outomatically reduced (e.g., to about ⅜ gallon of oil per hour or less) without interrupting the operation of the furnace. Conversely, continued operation can be automatically shifted from the low oil-air feed rate to the higher oil-air feed rate to the higher oil-air feed rate when more heat is called for.

A characteristic of the furnace that I have invented which is of extreme practical importance results from the fact that its construction is such that, in operation, it enables the fuel oil which is fed to the vaporization zone in the furnace to be spread as a film over the inner surface of the cylinder defining that vaporization zone, and wherein it is rapidly vaporized, without the necessity for resorting to any moving parts within the furnace. This is accomplished by virtue of the fact that the air for combustion that flows into that cylinder and then out through the pores in its wall directs the oil against the inner surface of that wall.

A specific embodiment of the apparatus which I now prefer to employ in the practice of my invention is illustrated schematically in the accompanying drawings in which:

FIG. 1 is a front elevation of my new furnace;

FIG. 2 is a vertical section, on a greatly enlarged scale, of the combustion chamber, and of conduits through which fuel oil and air are fed thereto, contained in the furnace illustrated in FIG. 1;

FIG. 3 is a section, on a reduced scale, along the lines 3—3 of FIG. 2;

Figure 4:
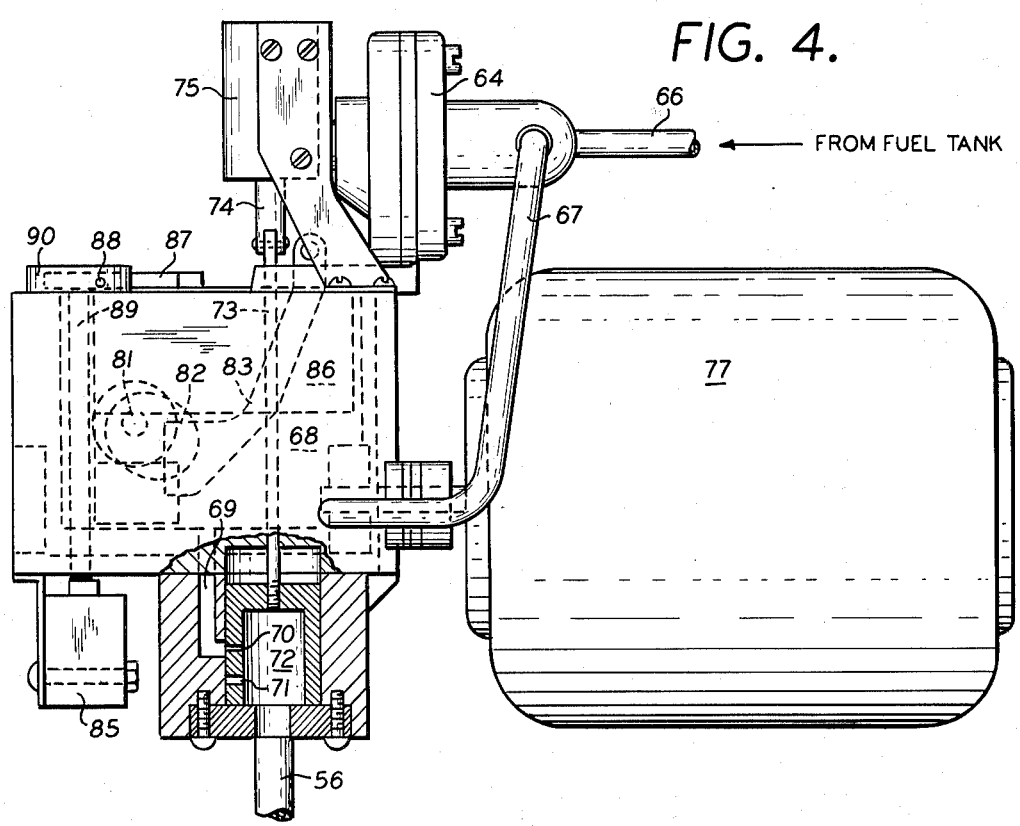
FIG. 4 is a front elevation, broken away in part, of the apparatus through which measured quantities of oil are supplied to the furnace.

The furnace 10 illustrated in FIG. 1 is of the induced draft type. It includes an outer casing 11 which contains a combustion chamber 12 and a heat exchanger 14 in the form of a boiler. Conduits 15 lead from combustion chamber 12 to the heat exchanger 14 for the passage of hot gases and products of combustion from the combustion chamber to the heat exchanger. They are withdrawn from the heat exchanger through pipe 16 by means of fan 16a driven by an electric motor (not shown) and discharged to the atmosphere through stack 16b. The combustion chamber 12, which is preferably made of a refractory material, has a generally cylindrical side wall 17, a concave floor 18 and a roof 19 having an axial inlet opening 20 therein. The ceiling 21 of roof 19 is preferably concave. The cylindrical wall 17 is provided with a series of spaced ports 23 at its upper end. A passageway 24 leads from each port 23, along a tangent to cylindrical wall 17, to a vertical passageway 25 in boss 26. Each passageway 25 communicates with a conduit 15 through an exhaust port 27. An opening 29 extends through wall 17 to receive the leads 30 of igniter 31.

The upper edge 35 of the inlet opening 20 in roof 19 is beveled to accommodate the outwardly flaring upper end 36 of an impervious sleeve 37 suspended from roof 19. Sleeve 37, which is made of a heat-resistant material such as stainless steel extends downwardly through inlet opening 20 to a point in the interior of combustion chamber 12 which is slightly below the plane across the lower walls of ports 23. The sleeve 37 is firmly seated in inlet opening 20 through the action of a ring 38 that is pressed against the upper surface of flaring end 35 by means of flange 39 extending from collar 40. A hollow porous cylinder 44 is also suspended from roof 19 so that it extends downwardly through inlet opening 20 into the interior of combustion chamber 12 to a point adjacent the plane across the bottom of cylindrical wall 17. Cylinder 44 has a flanged upper end 45 that is pressed against the upper surface of flange 39 by the flange 46 extending from the lower end of elbow 47. The flange 46 is firmly seated against flange 39, and the assembly of which they form a part is held in place, by bolts 48. A gasket 49 prevents gas from leaking between flanges 46 and 39.

The wall 51 of hollow cylinder 44 is fabricated from a porous heat-resistant material such as woven stainless steel screen, and its lower end is closed by disc 52 which is preferably made, as indicated in FIG. 2, from a woven screen similar to that used to make cylinder wall 51. However, disc 52 may be of an impervious heat-resistant material. The upper end 54 of hollow cylinder 44 is open to permit the ready introduction into the interior of cylinder 44 of fuel oil and air for combustion. The air is fed to the interior of hollow cylinder 44 through elbow 47, which is aligned therewith and connected with a conduit 55 that leads to the atmosphere. An oil supply pipe 56 extends from oil reservoir 57, and along the axes of conduit 55 and elbow 47, to a distributor head 58 located above the open end 54 of cylinder 44 and on the axis of that cylinder. Arcuate branch pipes 60 communicate through distributor head 58 with oil supply pipes 56 and are fastened through bosses 61 to the inner wall of elbow 47 adjacent its lower end to support distributor head 58 and oil supply pipe 56.

Figure 5:
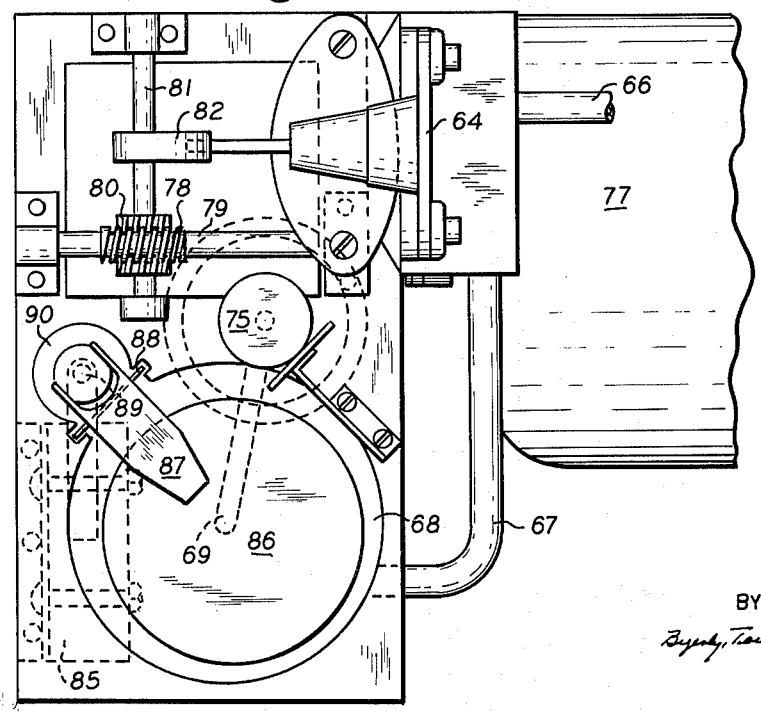
FIG. 5 is a plan view of the apparatus illustrated in FIG. 4.

The mechanism illustrated in FIGS. 4 and 5 through which a measured quantity of fuel oil is fed to the interior of hollow cylinder 44 includes a diaphragm pump 64 which is connected to the fuel oil tank 65 through pipe 66. A pipe 67 leads from pump 64 to oil reservoir 68. Conduit 69 connects oil reservoir 68 with pipe 56 through ports 70, 71 in piston 72. A rod 73 connects piston 72 with the core 74 of solenoid 75. The diaphragm pump is driven by means of motor 77 which rotates worm 78 mounted on motor shaft 79 to rotate gear 80 and the shaft 81. A cam 82 fixed to shaft 81 actuates rocker arm 83 to reciprocate the diaphragm (not shown) of pump 64 in conventional manner. The motor 77 is controlled by a microswitch 85 that is opened and closed by means of a float 86 whose position is controlled by the level of the oil in oil reservoir 68. Arm 87 pivoted at 88 is connected to float 86 and, supported by boss 90, actuates the microswitch as it is raised or lowered through the action of arm 87. A solenoid valve 91 in oil supply pipe 56 is adapted to shut off the supply of oil from reservoir 68.

The furnace illustrated in FIG. 1 includes, in addition to the fuel oil tank 65, an ignition fluid tank 93 which is connected to oil supply pipe 66 below solenoid valve 91 through pipe 94 for a purpose to be explained hereinafter.

Figure 6:
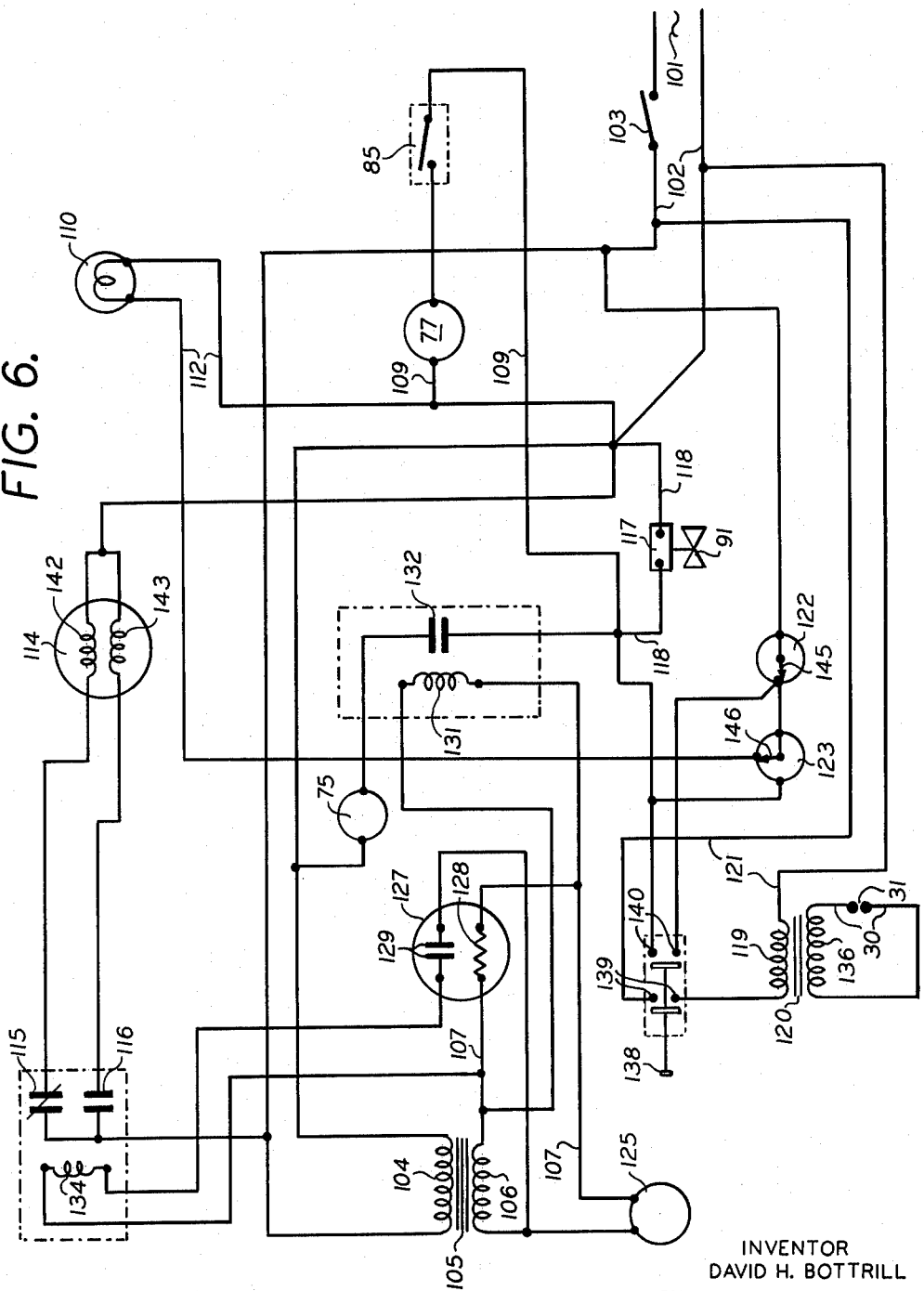
FIG. 6 is a diagram of an electric circuit for the controls that are preferably employed in the operation of my furnace.

The wiring diagram shown in FIG. 6 includes a power source 101 for the circuit 102 which is closed manually by means of the main switch 103, whereupon the primary 104 of transformer 105 is energized. The secondary 106 of transformer 105 supplies power to the control circuit 107. The motor 77 which drives the oil pump 64 is adapted to be connected with the circuit 102 through the circuit 109 which includes microswitch 85; a pilot lamp 110 is adapted to be connected with circuit 102 through circuit 112; the variable speed motor 114 that drives fan 16a is connected with circuit 102 through the switch 115 or the switch 116; the solenoid 117 that controls valve 91 is adapted to be connected through circuit 118 with circuit 102; and the primary coil 119 of the ignition transformer 120 is adapted to be connected with circuit 102 through circuit 121. The high limit safety switch 122 and the low limit safety switch 123 which are responsive, respectively, to the permissive high and low temperatures in the furnace are included for a purpose to be explained.

Included in the control circuit 107 are thermostat 125, the Amperite time delay tube 127 which contains resistance 128 and contacts 129, the relay 131 that is adapted to close contacts 132 in circuit 118, and the relay 134 that is adapted to open and close alternately the contacts 115 and 116 through which the variable speed motor 114 is connected with circuit 102.

The secondary 136 of the ignition transformer 120 is connected with leads 30 for igniter 31. A manually operable switch controlled by push button 138 is adapted to close normally open contacts 139 and 140 while that push button is normally depressed to start the furnace.

The operation of the furnace that I have described is as follows: It will be assumed that the furnace has not been in operation for some time, in which case the furnace and its parts will be at ambient temperature and the condition of the controls will be as illustrated schematically in FIG. 6. The switch 15 will then be in closed position so that the winding 142 that drives the motor at high speed, and which is not energized unless switch 116 is closed, will not be operative. Accordingly, when the main switch 103 is manually closed, the motor 114 commences to drive fan 16a at low speed.

The contact 145 in safety switch 122 is always in the closed position shown unless the temperature in the furnace becomes excessive; and the contact 146 is in the position illustrated in FIG. 6, where the circuit 112 containing pilot light 110 is closed, until the furnace reaches operating temperature. The contact 146 then swings over to open circuit 112 and close circuit 109 which contains the motor 77 for oil pump 64. The furnace 10 is brought to operating temperature through the use of ignition fluid (ordinary lighter fluid or petroleum naphtha) which is supplied to pipe 56 through pipe 94.

The solenoid valve 91 normally closes oil supply pipe 56 between the reservoir 68 and the junction of pipe 94 with oil supply pipe 66 so that, on starting the furnace, the fluid that may be fed to the interior or hollow cylinder 44 is limited to the more volatile ignition fluid. A quantity of that fluid (about one ounce will be sufficient to heat the furnace to operating condition) is placed in ignition fluid tank 93 and, as it flows down by gravity, the button 138 is manually depressed to close contacts 139 and 140, thereby energizing the secondary coil 136 of ignition transformer 120 and causing the igniter to spark and light the ignition fluid vapors contained in the combustion space surrounding the hollow cylinder 44. When the contacts 140 are closed, the circuit 109 is in the condition in which the pump will be placed in operation if the level of oil in the reservoir 68 should be low enough to cause the float 86 to sink to the point where arm 37 and rod 89 will be actuated to close microswitch 85. However, solenoid 75 is not then energized so only the "low-fire" quantity of oil is delivered through port 70.

As soon as the furnace 10 is brought to operating temperature through the combustion of ignition fluid vapors in combustion chamber 12, the contact 146 swings to the left opening circuit 112, closing circuit 118, and placing circuit 109 in the condition where it is closed when microswitch 85 is closed, without holding button 138 in depressed condition. Thereafter, when the circuit 107 controlled by thermostat 135 is closed through a call for heat, the resistance 128 in time delay tube 127 is heated to close contacts 129 thereby energizing relay 134 to open switch 115 and close switch 116 whereupon motor 114 shifts to high speed operation. At the same time, relay 131 is energized to close contacts 132 energizing solenoid 75 to raise piston 72, bringing the port 71 into register with conduit 69. When the circuit controlled by thermostat 125 is opened, motor 114 reverts to low speed and piston 72 returns to the position illustrated in FIG. 4 so that port 70 is brought into register with conduit 69.

Time delay tube 127 introduces a safety factor in the operation of my furnace by postponing the response to a change in operations dictated through the opening or closing of the circuit controlled by thermostat 125. A further safety factor can be introduced by means (not shown in the drawing) including a flywheel attached to the blades of fan 16a and connected with the shaft of motor 114 through an overrunning clutch so that the fan will continue to withdraw hot gases and products of combustion from boiler 14 for a while after cessation of the operation of motor 114.

The furnace will continue in operation as described so long as oil and air for combustion are supplied to hollow cylinder 44 and hot gases and products of combustion are withdrawn from the combustion chamber 12.

In such operation, oil 59 trickles from the arcuate branch pipes 60 at points spaced around and above the open end 54 of hollow cylinder 44. The air, which is supplied at a rate which exceeds by about 15% the stoichiometric equivalent of the oil fed to the furnace, enters the open end 54 of hollow cylinder 44 in concurrent flow with the oil 59 and then flows outwardly through the pores in wall 51. As it does so it tends to carry the oil 59 in the same direction so that the oil comes in contact with wall 51 and is vaporized before it reaches the bottom of cylinder 44. The vapors so produced also flow out through the pores in wall 51 and are burned in a spiral flame contained within the arcuate space between the inner surface of wall 17 and the outer surface of the wall 51 of cylinder 44. It will be appreciated that, to accomplish this, the cylinders 44 should be of such length that all of the oil 59 will have been vaporized before it reaches the lower end of cylinder 44; but it should not be much longer than this else the lower end of cylinder 44 might then become too hot.

It is to be understood that the terms which I have used in describing the specific embodiment of my invention that is illustrated in the accompanying drawings are terms of description and not of limitation and that various changes can be made in the structure so described without departing from the spirit of my invention as it is defined in the appended claims. For instance, my invention is not limited to induction furnaces, but can be practiced with advantage in connection with forced draft furnaces also, as will be readily apparent to those skilled in the art.

What I claim is:

1. The method of vaporizing and burning oil in a furnace which comprises:
   continuously feeding the oil to said furnace so that it is formed into a film which flows downwardly along a generally cylindrical path through a perpendicular vaporizing zone that is located along the axis of said furnace;

supplying heat to maintain, along said path, a temperature gradient which rises from below the distillation temperature of said oil at its entry into the furnace to a temperature, at a lower point in said path, which is substantially above said distillation temperature, so that the oil in said film is vaporized;

delivering air for combustion to said furnace so that it flows concurrently with said oil and issues from the vaporizing zone in admixture with the oil vapors to an annular combustion zone surrounding said vaporizing zone;

burning said oil vapors in said combustion zone so that heat sufficient to maintain said temperature gradient is supplied to the vaporizing zone while oil is fed to the furnace; and withdrawing the products of combustion and hot gases from the furnace along a line tangent to the outer wall of said combustion zone so that the flame within said combustion zone follows an upward spiral path.

2. The method of vaporizing and burning oil in a furnace which comprises:

continuously feeding the oil to said furnace so that it is formed into a film which flows downwardly along a generally cylindrical path through a perpendicular vaporizing zone that is located along the axis of said furnace;

supplying heat to maintain, along said path, a temperature gradient which rises from below the distillation temperature of said oil at its entry into the furnace to a temperature, at a lower point in said path, which is substantially above said distillation temperature, so that the oil in said film is vaporized;

delivering air for combustion to said furnace so that it flows concurrently with said oil and issues from the vaporizing zone in admixture with the oil vapors to an annular combustion zone surrounding said vaporizing zone;

burning said oil vapors in said combustion zone so that heat sufficient to maintain said temperature gradient is supplied to the vaporizing zone while oil is fed to the furnace; and withdrawing the products of combustion and hot gases from the furnace above the point of entry of said oil vapors into the combustion zone, and along a line tangent to the outer wall of said combustion zone.

3. The method of vaporizing and burning fuel oil in a furnace which comprises:

feeding the oil to a combustion chamber enclosing a combustion zone located within said furnace by introducing said oil into a hollow cylinder surrounded by said combustion zone and having an open upper end and a porous wall extending along the perpendicular axis of said combustion chamber so that a film of oil flows downwardly over the surface of said wall;

supplying heat to said cylinder so that, while oil is introduced into the cylinder, a temperature gradient is maintained which ranges from a point below the distillation temperature of the oil at the upper end of the cylinder to a temperature which is substantially above said distillation temperature at the lower end of the cylinder and the oil in said film is vaporized;

delivering air for combustion to the cylinder through said open end so that it flows concurrently with the oil and issues, in admixture with oil vapor, from the pores in said wall into said combustion zone;

burning said oil vapors in said combustion zone whereby sufficient heat is supplied to maintain said temperature gradient; and thereafter withdrawing products of combustion and hot gases from the furnace.

4. A furnace for vaporizing and burning fuel oil comprising:

a heat-resistant combustion chamber having a floor, a generally cylindrical side wall and a roof having an axial inlet opening therein;

a passageway extending through said side wall adjacent its upper end and communicating with an exhaust port;

a hollow porous cylinder of heat-resistant material communicating with said inlet opening and suspended from said roof so that it extends downwardly along the axis of the combustion chamber to a point adjacent said floor;

means for feeding oil to the interior of said cylinder at its upper end so that it flows downwardly in a film over the inner surface of said cylinder;

means for supplying air for combustion to the combustion chamber through said inlet opening so that it flows through the pores in said cylinder; and means for causing hot gases and products of combustion to flow from the combustion chamber through said passageway.

5. A furnace for vaporizing and burning fuel oil comprising:

a heat-resistant combustion chamber having a floor, a generally cylindrical side wall and a roof having an axial inlet opening therein;

a tangential passageway extending through said side wall adjacent its upper end and communicating with an exhaust port;

a hollow porous cylinder of heat-resistant material communicating with said inlet opening and suspended from said roof so that it extends downwardly along the axis of the combustion chamber to a point adjacent said floor;

means for feeding oil to the interior of said cylinder at its upper end so that it flows downwardly in a film over the inner surface of said cylinder;

means for supplying air for combustion to the combustion chamber through said inlet opening so that it flows through the pores in said cylinder; and means for causing hot gases and products of combustion to flow from the combustion chamber through said tangential passageway.

6. A furnace for vaporizing and burning fuel oil comprising:

a heat-resistant combustion chamber having a concave floor, a generally cylindrical side wall and a roof having an axial inlet opening therein;

a passageway extending through said side wall adjacent its upper end and communicating with an exhaust port;

a hollow porous cylinder of heat-resistant material communicating with said inlet opening and suspended from said roof so that it extends downwardly along the axis of the firebox to a point adjacent the plane across the lower end of said wall;

means for feeding oil to the interior of said cylinder at its upper end so that it flows downwardly in a film over the inner surface of said cylinder;

means for supplying air for combustion to the combustion chamber through said inlet opening so that it flows through the pores in said cylinder; and means for causing hot gases and products of combustion to flow from the combustion chamber through said passageway.

7. A furnace for vaporizing and burning fuel oil comprising:

a heat-resistant combustion chamber having a floor, a generally cylindrical side wall and a roof having an axial inlet opening therein;

a passageway extending through said side wall adjacent its upper end and communicating with an exhaust port;

a hollow porous cylinder of heat-resistant material communicating with said inlet opening and suspended from said roof so that it extends downwardly along the axis of the combustion chamber from the inlet opening to a point adjacent said floor;

an impervious sleeve of heat-resistant material, whose inner diameter is greater than the outer diameter of the cylinder, surrounding the portion of said cylinder that extends from its top to a point below the lower edge of said tangential passageway;

means for feeding oil to the interior of said cylinder at its upper end so that it flows downwardly in a film over the inner surface of said cylinder;

means for supplying air for combustion to the combustion chamber through said inlet opening so that it flows through the pores in said cylinder; and means for causing hot gases and products of combustion to flow from the combustion chamber through said passageway.

8. A furnace for vaporizing and burning fuel oil comprising:

a heat-resistant combustion chamber having a floor, a generally cylindrical side wall and a roof having an axial inlet opening therein;

a passageway extending through said side wall adjacent its upper end and communicating with an exhaust port;

a hollow porous cylinder of heat-resistant material communcating with said inlet opening and suspended from said roof so that it extends downwardly along the axis of the combustion chamber to a point adjacent said floor;

thermally responsive means for feeding varying quantities of oil to the interior of said cylinder at its upper end so that it flows downwardly in a film over the inner surface of said cylinder;

means for supplying corresponding quantities of air for combustion to the combustion chamber through said inlet opening so that it flows through the pores in said cylinder; and means for causing hot gases and products of combustion to flow from the combustion chamber through said passageway.

9. A furnace for vaporizing and burning fuel oil comprising:

a heat-resistant combustion chamber having a floor, a generally cylindrical side wall and a roof having an axial inlet opening therein;

a tangential passageway extending through said side wall adjacent its upper end and communicating with an exhaust port;

a hollow porous cylinder of heat-resistant material communicating with said inlet opening and suspended from said roof so that it extends downwardly along the axis of the combustion chamber to a point adjacent said floor;

means for feeding oil to the interior of said cylinder at spaced points around and above its upper end so that it trickles downwardly and forms a film over the inner surface of said cylinder;

means for supplying air for combustion to the combustion chamber through said inlet opening so that it flows through the pores in said cylinder; and means for causing hot gases and products of combustion to flow from the combustion chamber through said tangential passageway.

10. A furnace for vaporizing and burning fuel oil comprising:

a heat-resistant combustion chamber having a floor, a generally cylindrical side wall and a roof having an axial inlet opening therein;

a tangential passageway extending through said side wall adjacent its upper end and communicating with an exhaust port;

a hollow porous cylinder of heat-resistant material having a closed lower end and having an open upper end communicating with said inlet opening and suspended from said roof so that it extends downwardly along the axis of the combustion chamber to a point adjacent said floor;

means for feeding oil to the interior of said cylinder at its upper end so that it flows downwardly in a film over the inner surface of said cylinder;

means for supplying air for combustion to the combustion chamber through said inlet opening so that it flows through the pores in said cylinder; and means for causing hot gases and products of combustion to flow from the combustion chamber through said tangential passageway.

References Cited by the Examiner

UNITED STATES PATENTS

| 883,373 | 3/1908 | Akeson | 158—91 |
|---|---|---|---|
| 2,284,037 | 5/1942 | Braida | 158—4 |
| 2,540,018 | 1/1951 | Towar | 158—4 |
| 2,705,530 | 4/1955 | MacCracken | 158—4 |

FOREIGN PATENTS 674,829  10/1929  France.

FREDERICK L. MATTESON, JR., *Primary Examiner.*

JAMES W. WESTHAVER, *Examiner.*